United States Patent [19]
Yearout

[11] 3,756,035
[45] Sept. 4, 1973

[54] SEPARATION OF THE COMPONENTS OF GAS MIXTURES AND AIR

[75] Inventor: James D. Yearout, Rolling Hills, Calif.

[73] Assignee: McDonnell Douglas Corporation, Santa Monica, Calif.

[22] Filed: Aug. 14, 1970

[21] Appl. No.: 63,926

Related U.S. Application Data

[63] Continuation of Ser. No. 626,603, March 28, 1967, which is a continuation-in-part of Ser. No. 539,840, April 4, 1966, abandoned.

[52] U.S. Cl............................ 62/22, 62/24, 62/26, 62/31, 62/39
[51] Int. Cl............. F25j 3/04, F25j 3/02, F25j 5/00
[58] Field of Search ................ 62/27, 28, 29, 29 A, 62/30, 40, 39, 38, 31, 22, 24, 26; 203/99, 100; 202/158

[56] References Cited
UNITED STATES PATENTS

| | | | |
|---|---|---|---|
| 2,070,100 | 2/1937 | Twomey | 203/99 |
| 2,861,432 | 11/1958 | Haselden | 62/29 |
| 2,713,780 | 7/1955 | Williams | 62/34 |
| 3,258,930 | 7/1966 | Jakob | 62/29 |
| 2,823,523 | 2/1958 | Eakin et al | 62/39 |
| 2,677,945 | 5/1954 | Miller | 62/31 |
| 2,713,781 | 7/1955 | Williams | 62/34 |
| 3,264,831 | 8/1966 | Jakob | 62/38 |
| 2,040,431 | 5/1936 | Dean et al | 202/158 |

Primary Examiner—Wilbur L. Bascomb, Jr.
Attorney—Max Geldin

[57] ABSTRACT

This invention is directed to an efficient system for separating particularly oxygen and nitrogen from air, which involves, according to one embodiment, separating air in an initial separation stage to produce cold nitrogen vapor and an oxygen-rich liquid, feeding the oxygen-rich liquid to a second separation stage or fractionating column in heat exchange relation with the initial separation stage, compressing the cold nitrogen and passing it into heat exchange relation with the lower portion of said fractionating column for addition of heat thereto, cooling the exiting nitrogen and passing such cooled nitrogen in heat exchange relation with the upper portion of said column for removal of heat therefrom, an external refrigerant medium also being employed in the upper portion of said column to provide additional refrigeration, said nitrogen and external refrigerant being passed through said column under conditions to affect a "differential" distillation in the column.

8 Claims, 6 Drawing Figures

SEPARATION OF THE COMPONENTS OF GAS MIXTURES AND AIR

This application is a continuation of my copending application Ser. No. 626,603, filed Mar. 28, 1967, which in turn is a continuation-in-part of my co-pending application, Ser. No. 539,840, filed Apr. 4, 1966 and abandoned in favor of continuation application Ser. No. 828,806, filed May 26, 1969, now U.S. Pat. No. 3,564,571.

This invention relates to the separation of the components of gas mixtures, particularly air, by rectification, and is particularly concerned with procedure for the separation of nitrogen and oxygen from air in multiple separation zones which are suitably associated in heat exchange relation, employing in one or more of said zones the principles of "differential" distillation, and with a system for carrying out such procedure.

Nitrogen and oxygen for commercial use are usually separated from air by procedure involving liquefaction of the air, and fractional distillation so that the oxygen and nitrogen constituents are separated from each other. In the liquefaction and rectification of a gas such as air, the gas is introduced into the rectification column, e.g., at its saturation temperature, and the operational drive for the column is the temperature differential between the bottom and the top thereof. To produce such temperature differential, heat is removed from the top of the column and heat is added to the bottom of the column or the still. Hence, for example, as described in U.S. Pat. No. 3,258,929 of James K. La Fleur, in the separation of air into oxygen and nitrogen, heat is added to the bottom of the column to produce rising oxygen vapors in the column, by introducing compressed air in heat exchange relation with the bottom of the column before such air is introduced into the column. Heat is removed from the top of the column to condense the nitrogen and provide a descending liquid nitrogen reflux, by introducing a refrigerant, e.g., cold gaseous helium, at a temperature below the condensation temperature of nitrogen, into heat exchange relation in the top of the column.

In the operawtion of a fractionating column, e.g., for the separation of oxygen and nitrogen from air, it has been found that the liquid and vapor in the column are near or at equilibrium only at certain points in the column. It has been found according to the invention described in my above co-pending application Ser. No. 539,840, that substantially greater efficiency is achieved and equilibrium between liquid and vapor is obtained substantially incrementally throughout the height of the column, by adding heat along the lower portion of the column, and by removing heat along the upper portion of the column. Such continuous incremental addition of heat to the lower portion of the column and continuous incremental removal of heat from the upper portion of the column results in "differential" distillation, rather than "fractional" distillation. In this manner, equilibrium is much more closely approached throughout the column, thereby substantially increasing the efficiency of the column.

As applied particularly to the separation of oxygen and nitrogen from air, the process of the above copending application involves introducing air into a fractionating column, passing a gaseous medium such as helium into heat exchange relation along the lower portion of the fractionating column under conditions to supply heat to the lower portion of said column, cooling the resulting heated helium and passing such cooled helium gas into heat exchange relation along the upper portion of such column under conditions to remove heat from said upper portion of the column. Such operation is carried out preferably under conditions to affect a "differential" distillation of the feed gas mixture or air in the column. For this purpose, the helium functions as a heat pump which preferably circulates in a closed cycle.

The present invention involves the use of multiple or plural separation zones for separation of the components of a multi-component gas mixture containing at least two components having different boiling points, such as air, with the respective separation zones, suitably associated in heat exchange relation with each other, so as to obtain proper temperature distribution between each of the zones. "Differential" distillation, as described in my above co-pending application, is employed in at least one of such separation zones utilizing as the external or heat pumping fluid, any fluid having a substantially constant composition as it passes in heat exchange relation with the contents of the zone or column along the column, and affects a continuous heat transfer along said column between the fluid and the vapor-liquid mixture in the column, and a nonadiabatic differential distillation in the column. According to the invention, as described in detail hereinafter, the system is operated under conditions so as to produce such differential distillation throughout the column.

Such external heat pumping fluid can be a single component fluid or a multicomponent fluid such as air, and can remain in a single phase, e.g., the gas phase, as it passes in heat exchange relation along the column, or it can be converted from one phase to another phase during such passage along the column, while affecting said "differential" distillation. Thus, such external fluid can be one which condenses at the proper temperaure which is required for addition of heat to the lower portion of the fractionating column, and which evaporates at the proper temperature required to remove heat from the upper portion of the column. Such external heat exchange fluid can therefore be the lowest boiling point component or most volatile component of the multi-component mixture being separated. Thus, in the separation of the components of air according to the invention principles, nitrogen can be employed as the heat pumping fluid in one or more of the multiple separation zones of the invention, the nitrogen condensing during passage thereof in heat exchange relation along the lower portion of the column to supply heat to the lower portion of the column, and vaporizing during passage in heat exchange relation along the upper portion of the column to remove heat from the upper portion of the column.

According to one embodiment of the present invention, there is provided a process and system for the separation of oxygen and nitrogen from a mixture thereof, which comprises introducing the mixture as feed into a fractionating column, passing nitrogen into heat exchange relation with the lower portion of the column under conditions to supply heat to the lower portion of the column, cooling the nitrogen and introducing such cooled nitrogen into the upper portion of the fractionating column to remove heat from the upper portion of said column. Thus, nitrogen is utilized as a heat pump to transfer heat from the upper portion of the column to the lower portion thereof, utilizing differential distillation in the column for increasing the efficiency thereof.

In preferred practice according to the invention, there is employed in conjunction with the main fractionating column utilizing nitrogen as a heat pump and differential distillation as noted above, an initial separation stage associated in heat exchange relation with the main fractionating column, and wherein air is first separated into cold nitrogen and an oxygen-rich liquid, the latter being employed as feed to the main fractionating column, and cold compression of such nitrogen, which is then employed as the heat pump for adding heat to the lower portion of the fractionating column and removing heat from the upper portion thereof.

Also, in accordance with the invention an external refrigerant medium, such as helium, or gaseous nitrogen is brought into heat exchange relation with the upper portion of the column, and preferably, the liquid oxygen produced in the lower portion of the column is vaporized and also brought into heat exchange relation with the upper portion of the main fractionating column or in heat exchange relation with the initial separation zone to provide additional refrigeration therein. However, as will be noted below, the use of such liquid oxygen to provide further refrigeration for the column is optional.

According to a further embodiment, where it is desired to separate all three components of air, including oxygen, nitrogen and argon, three separation zones are provided in suitable heat exchange relation to each other. In this embodiment nitrogen from the initial separation zone is employed for addition of heat in the third separation zone, and the exiting nitrogen cooled and employed to provide reflux for the second and first separation zones. An external refrigerant such as helium is employed to affect additional refrigeration in the first and second separation zones. The three separation zones are suitably disposed with respect to each other to provide the required heat distribution to affect separation in each of the three separation zones, employing nitrogen as a heat pump, and utilizing differential distillation principles in the second and third separation zones.

By practice of the process of the invention, only moderate compression of air feed is required, and the main fractionating column can be operated at pressures which are substantially atmospheric or slightly greater. According to the invention nitrogen and oxygen, and also argon, if desired, can be separated at high purity from air in an efficient system at an economical cost per ton of oxygen and nitrogen produced. Such system employs relatively few components, hence the capital cost of such system is relatively low. Further, the system can be operated with high versatility to produce both nitrogen and oxygen as gases, or to produce nitrogen gas and liquid oxygen. In the process, the only gas requiring significant compression is the cold gaseous nitrogen withdrawn from the initial separation stage, and which is utilized as the heat pump as noted above, and since such compression is carried out at relatively low temperatures power requirements for this purpose are at a minimum.

The invention will be understood more clearly by the description below of certain embodiments of the invention taken in connection with the accompanying drawing wherein.

Figure 1:
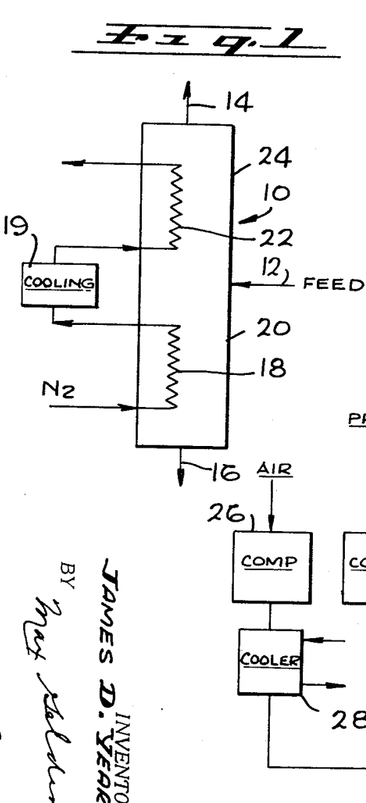
FIG. 1 is a schematic representation of a nitrogen heat pump according to the invention.

Referring to FIG. 1 of the drawing, illustrating the use of a nitrogen heat pump in the invention, an oxygen-nitrogen feed mixture 12 is introduced into the fractionating or differential distillation column 10, at a point intermediate the top and bottom of the column. Nitrogen, preferably under compression and at a temperature above the temperature within the lower portion of the column, is passed upwardly through a heat exchanger arrangement 18 under conditions such as to supply heat to the lower portion 20 of the column below the point of introduction of the feed 12. The cooled nitrogen exiting from the upper end of the heat exchanger 18 is then subjected to further cooling by suitable means as indicated at 19, and is then introduced into and passed through the heat exchanger arrangement 22 in the upper portion of column 10 above the point of introduction of feed 12. The nitrogen circulating through the heat exchanger 22 abstracts or withdraws heat from the upper portion 24 of the column. A nitrogen gas overhead 14 is withdrawn from the upper end of the column and oxygen is withdrawn at 16 from the lower end of the column.

Figure 2:
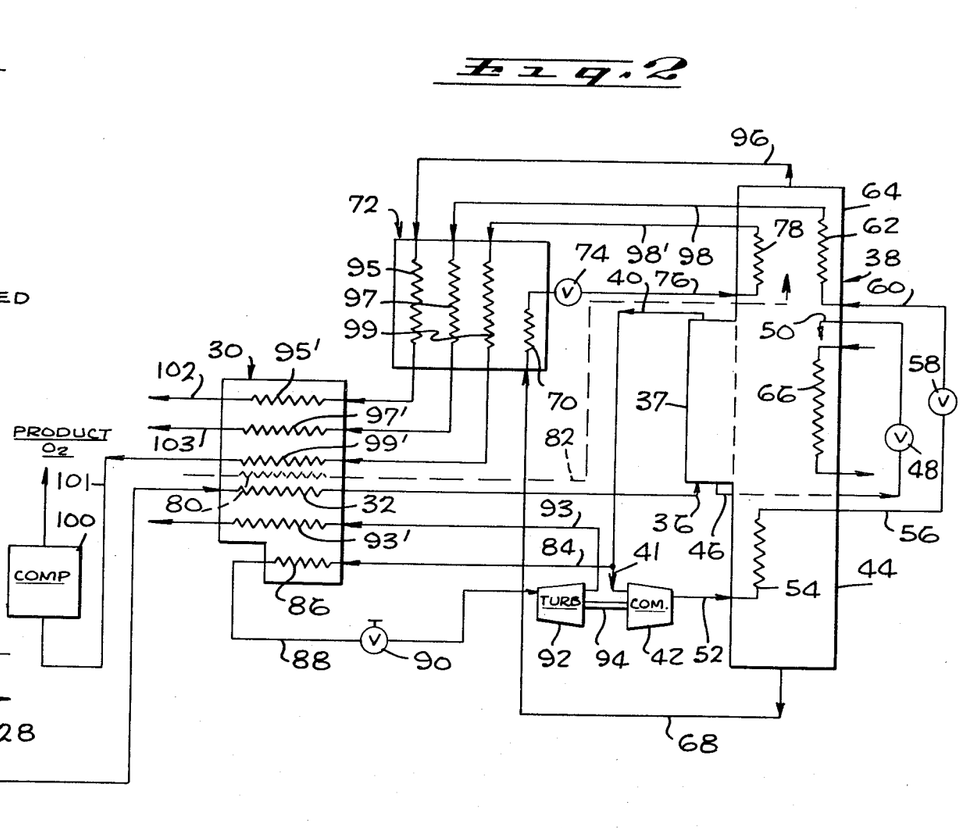
FIG. 2 is a schematic representation of a preferred form of air separation system for separating oxygen and nitrogen in gaseous form, employing two associated separation zones according to the invention principles.

Now referring to FIG. 2 of the drawing, illustrating a preferred embodiment for separating nitrogen and oxygen from air according to the invention, atmospheric air is first compressed in a compressor 26 to a pressure of about 2.2 atmospheres and the heat of compression of the gas is rejected by passage through a cooler 28. The compressed air is then cleaned and cooled by passage through coil 32 of a regenerative heat exchanger 30 to approximately saturation. The resulting saturated air at a pressure of about 2.2 atmospheres and a temperature of about 160° R (Rankine), is then introduced at 36 into the lower end of a separator 37 which is mounted in heat exchange relation with the upper portion of a main fractionating column 38, the pressure within the separator 37 being about 2.2 atmospheres.

In the initial separation stage 37 essentially pure nitrogen vapor still at a pressure of about 2.2 atmospheres and a temperature of 153° R is withdrawn at 40 from the top of the separator 37, and a portion of such cold nitrogen gas at 41 is further compressed in the compressor 42 to a pressure of about 4.8 atmospheres, the temperature of such nitrogen gas being thus increased to 208° R. The cold nitrogen from the separator 37 is compressed at 42 to a pressure at which it will condense when brought into heat exchange relation with fluid in the lower portion 44 of fractionating column 38, as described below.

An oxygen-rich liquid mixture of oxygen and nitrogen containing about 46 percent oxygen is withdrawn at 46 from the bottom of the initial separation stage 37, at a pressure of about 2.2 atmospheres and at 160° R, and is flashed by the throttling valve 48 to a pressure of about 1.3 atmospheres, the operating pressure within the fractionating column 38, and the resulting flashed fluid having a temperature of 151° R is introduced at 50 into the fractionating column.

The heat which is supplied to the lower portion of the fractionating column 38, and which is removed from the upper portion of the fractionating column in order to maintain the operational drive for the column, is provided in the following manner according to the invention. The cold compressed nitrogen discharged from compressor 42 and at a temperature of 208° R is introduced at 52 into the bottom of a heat exchanger construction 54 disposed lengthwise in the lower portion of fractionating column 38 below the air feed inlet 36 to the associated separator 37. Since the temperature of the compressed nitrogen gas passing through the heat exchanger 54 is at a temperature generally higher than the temperature of the fluid in the lower portion of column 38 and above the temperature of the boiling oxygen at the bottom of the column, heat is supplied by such nitrogen to the lower portion of the column under conditions to provide substantial equilibrium of the vapor and liquid throughout the lower portion of the column and to provide reboil heat for supporting and maintaining boiling of the liquid oxygen in the lower portion of the column.

The nitrogen exiting the upper end of heat exchanger 54 is in the form of a subcooled liquid still at a pressure of about 4.8 atmospheres and at a temperature of 152° R. The subcooled nitrogen liquid is cooled further by passage of such liquid through a throttling valve 58, reducing the temperature of the exiting nitrogen liquid to 142° R and reducing the pressure thereof to about 1.2 atmospheres.

The resulting cooled nitrogen liquid at 60 is then passed into the lower end of a heat exchanger arrangement 62 disposed lengthwise in the upper portion 64 of the main fractionating column 38 and such fluid is evaporated in such heat exchanger arrangement, withdrawing heat from the upper portion of the column under conditions to maintain the liquid and vapor therein in substantial equilibrium and to provide reflux for the column.

Thus, from the above, it is seen that essentially pure nitrogen functions as a heat pump in the system of the invention, transferring heat removed from the upper portion of the column to the lower portion of the column, such nitrogen preferably adding heat continuously throughout the separation zone in the lower portion of the column, and withdrawing heat continuously throughout the separation zone in the upper portion of the column.

Additional refrigeration is generally also required in the upper portion of column 38 above the level of introduction of the air feed at 36. Such external refrigerant in preferred practice can be refrigerated helium gas at a substantially lower temperature than the fluid in the interior of the upper portion of the column, and which refrigerant can be produced by the system of the La Fleur U.S. Pat. No. 3,194,026. Such refrigerant helium gas is passed through a heat exchanger construction 66 in the upper portion of the fractionating column 38 at a level therein which is substantially directly opposite the initial air separator 37, thus providing additional refrigerant for the main fractionating column and also the refrigeration required for the initial separation of the air in separator 37. It will be seen that the initial air separation zone 37 is mounted in heat exchange relation in such a location with respect to the second or main separation zone 38 so that the refrigeration afforded by the evaporation of fluid in the second separation zone supplies refrigeration to the first separation zone. Additional refrigeration required is supplied by the external refrigerant such as helium which is in heat exchange relationship with both zones.

Oxygen product is withdrawn as a liquid from the main fractionating column at 68 at a pressure of about 1.3 atmospheres and a temperature of about 166° R and is subcooled by passage through coil 70 of heat exchanger 72 to a temperature of 146° R. Such subcooled liquid oxygen is then reduced to a pressure by passage through throttling valve 74, at which the resulting boiling liquid oxygen will condense vapors rising in the upper portion 64 of the main fractionating column 38. The resulting throttled oxygen now reduced to a pressure of 0.25 atmospheres and a temperature of 142° R is then passed upwardly through a heat exchanger arrangement 78 in the upper portion of column 38 to provide additional refrigeration and reflux at the top of the column.

The heat exchanger constructions 54 and 62 for the nitrogen, 66 for the external helium refrigerant, and 78 for the oxygen, each can be in the form of a plate-fin heat exchanger (not shown) arranged in heat exchange relation with channels bearing the liquid-vapor mixture being separated in the column. Such channels may be constructed in the manner of a perforated fin compact heat exchanger, producing the effect of distillation column trays. This is a known type of heat exchanger arrangement described in International Advances in Cryogenics, Vol. 10, 1965, and since such heat exchanger forms no part of the present invention, it is not shown. Although in preferred practice such a plate-fin type of heat exchanger arrangement is employed at 54, 62, 66, and 78, any suitable form of heat exchanger arrangement can be employed for this purpose. Thus, for example, a column having conventional trays or plates can be employed with suitable heat exchanger means employed for conducting the nitrogen, helium and oxygen into heat exchange relation with such trays or plates, preferably so as to effect the above described differential distillation in the column.

In the fractionating column 38, the oxygen-rich mixture of nitrogen and oxygen entering the column at 50 is permitted to expand in the column which is maintained at a pressure of about 1.3 atmospheres. The nitrogen liquid which descends from the top of the column as reflux, becomes richer in oxygen and leaner in nitrogen as it proceeds toward the bottom of the column, while the stream of oxygen vapor which rises from the bottom of the column becomes richer in nitrogen as it rises toward the top of the column. By the addition of heat to the lower portion of the column and the removal of heat from the upper portion of the column in the manner described above, the descending liquid and ascending vapor in the column are brought into equilibrium throughout the height of the column.

If desired, additional air vapor feed compressed to a pressure of about 2.2 atmospheres and cooled by passage through coil 80 of the heat exchanger 30 can also be introduced as indicated by dotted line 82, into the column 38. However, this additional air feed is optional, and is employed under conditions where sufficient refrigeration is provided in the column to handle this additional feed input to the column.

The power to drive the nitrogen compressor 42 can be provided by diverting a portion of the compressed nitrogen stream 40 from the initial separator 37, as indicated at 84, for this purpose. Such cold nitrogen stream 84 is passed through coil 86 of heat exchanger 30 in countercurrent heat exchange relation with incoming air feed at 32 and also with additional air feed 80 if employed, for cooling same, the exiting nitrogen stream at 88 being thus warmed to a temperature of 169° R. The resulting warm nitrogen stream is then passed through a control valve 90 and expanded in the turbine 92 from an inlet pressure of about 2.1 atmospheres to a discharge pressure of 1.2 atmospheres, the exiting expanded nitrogen stream 93 thus being cooled to a temperature of 143° R. The nitrogen stream 93 is then passed through coil 93' of heat exchanger 30 for cooling feed air at 32 and is vented at ambient temperatures. The turbine 92 is interconnected at 94 with the compressor 42 for driving same. It will be noted that the temperature of the warmed nitrogen stream at 88 required depends upon the efficiencies of turbine 92 and compressor 42. However, the heat exchanger 30 can be designed so that the nitrogen stream withdrawn from coil 86 is at the proper temperature so that machines 92 and 42 are substantially exactly matched. Valve 90 provides the proper speed control, and under such conditions no external motor drive is required for the compressor 42. This substantially increases the power efficiency of the system.

However, if desired, the system of FIG. 2 of the invention can be operated so that all or a portion of the power requirement for compressor 42 can be supplied by an external motor drive, with a greater proportion or all of the cold nitrogen at 40 being compressed at 42 and employed for carrying out the differential distillation at 54 and 62 in the main column 38.

Nitrogen overhead vapor withdrawn at 96 from the top of the column 38, at a pressure of about 1.3 atmospheres and a temperature of 144° R, nitrogen vapor withdrawn at 98 from the exchanger 62 in the upper portion of column 38 and at a pressure of 1.2 atmospheres and a temperature of 142° R, and oxygen vapor withdrawn at 98' from the heat exchanger 78 in the upper portion of the column, and at a pressure of 0.25 atmospheres and at a temperature of 142° R, are passed through coils 95, 97 and 99, respectively, of the liquid oxygen subcooler 72, for subcooling the liquid oxygen at 70, and the exiting streams are then passed in countercurrent heat exchange relation through coils 95', 97', and 99', respectively, of the regenerative heat exchanger 30, for cooling air fedd stream 32, and, if employed, the additional air feed stream 80. An oxygen compressor 100 is provided for the product oxygen gas withdrawn at 101 at about ambient temperature. Nitrogen gas at 102 and 103 is withdrawn at about ambient temperature. If desired, the oxygen compressor can be positioned between point 98 at the exit of exchanger 78, and coil 99 of the subcooler 72.

Figure 3:
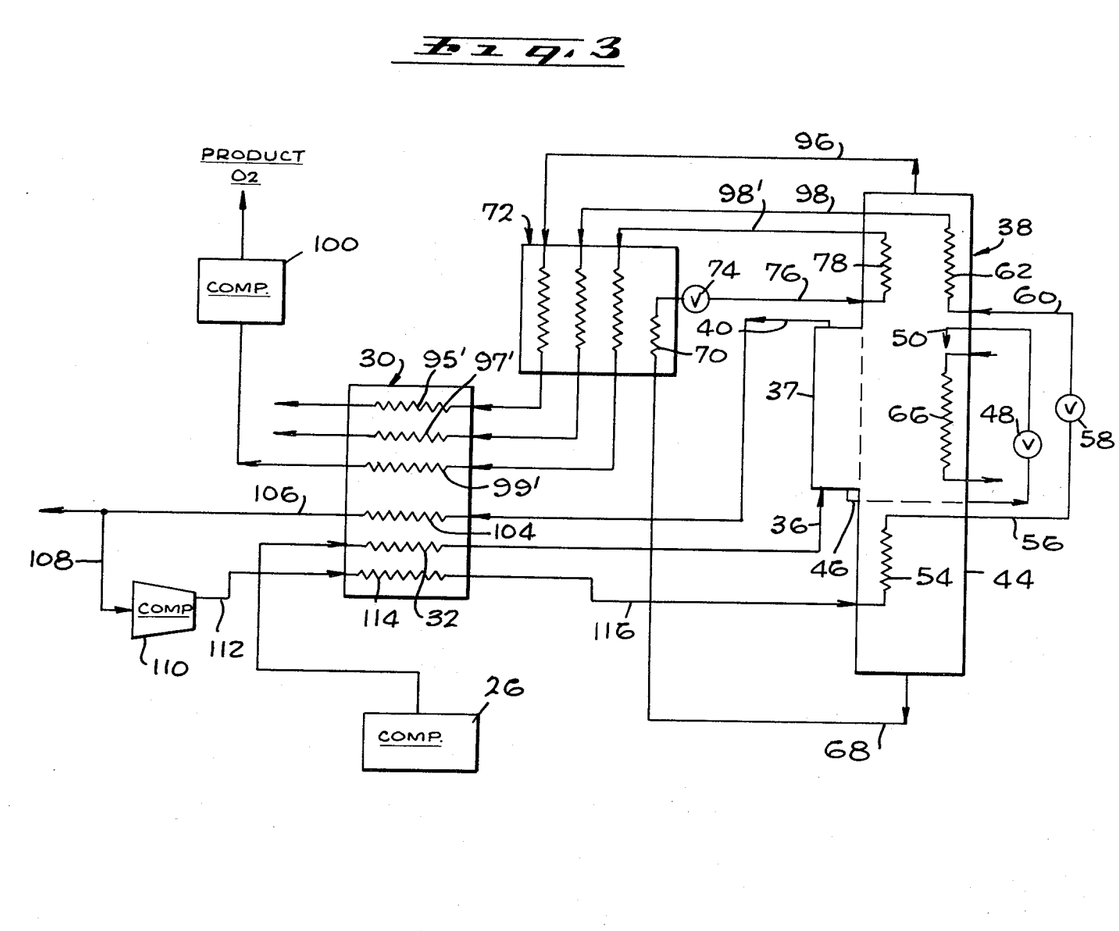
FIG. 3 is a schematic representation of a modified form of air separation system, employing the invention principles.

A variation of the system described above and illustrated in FIG. 2 is shown in FIG. 3 of the drawing. In the modification of FIG. 3, all of the nitrogen gas overhead 40, withdrawn from the initial air separator 37, is passed through coil 104 of the regenerative heat exchanger 30, in countercurrent heat exchanger relation with air feed at 32, and the exiting nitrogen stream at 106 is thus warmed to approximately ambient temperature. A portion, e.g., about 50 percent, of such warmed nitrogen, at a pressure of about 2.2 atmospheres, is then charged at 108 to the inlet of a compressor 110, the exiting nitrogen gas at 112 being boosted in pressure to somewhat above 4 atmospheres. Such compressed nitrogen is cooled by passage through coil 114 of heat exchanger 30 so that the exiting cold nitrogen has a temperature near its saturation point, and such cold compressed nitrogen at 116 then enters the heat exchanger arrangement 54 in the lower portion 44 of the main fractionating column 38 to provide the heat addition required throughout the bottom portion of the column, as described above.

The modified system described above and illustrated in FIG. 3 is somewhat less efficient than that of FIG. 2, due to the use of a nitrogen recycle compressor operating at ambient temperature, rather than the cold nitrogen recycle compressor employed at 42 in FIG. 2.

Figure 4:
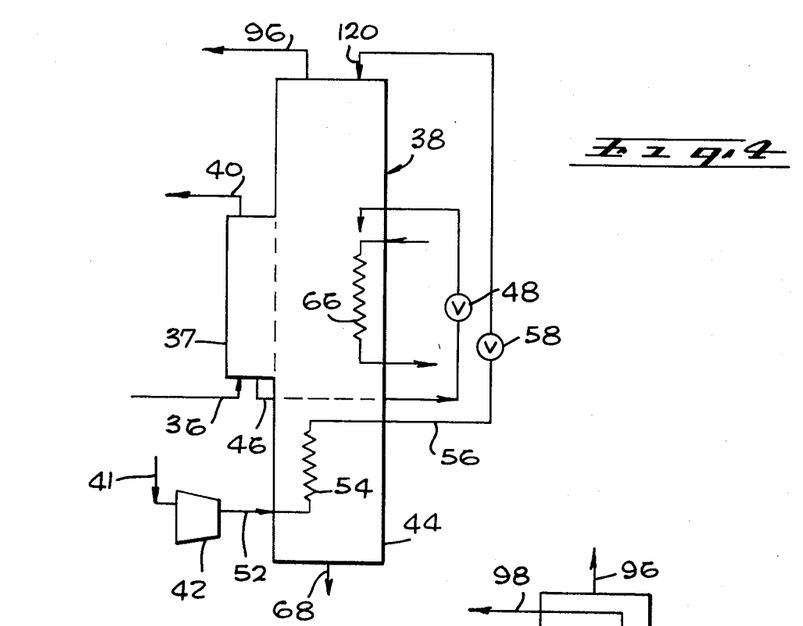
FIG. 4 illustrates a modified form of the invention concept.

FIG. 4 illustrates still another modification of the system described above and shown in FIG. 2. In the modification of FIG. 4, liquid nitrogen at 56 exiting the heat exchanger arrangement 54 in the lower portion 44 of column 38, after being throttled at 58 to a pressure of about 1.3 atmospheres, approximately the pressure maintained within column 38, and at a temperature of about 142° R, is introduced at 120 directly into the top of column 38 to function as reflux and refrigerant therein. In such modification, an external refrigerant, such as helium, is passed in heat exchange relation with the upper portion of the column, as through heat exchanger arrangement 66, to effect the differential distillation in the upper portion of the column. If desired, in the system of FIG. 4, liquid oxygen withdrawn from the main column at 68 can be subcooled as at 70 in FIG. 2 and passed in heat exchange relation with the upper portion of the column, as at 78 in FIG. 2. However, if sufficient refrigeration is provided by the external refrigerant at 66 and by use of a sufficient amount of nitrogen reflux at 120, recycle oxygen may not be required as an additional refrigerant in the upper portion of the column.

Figure 5:
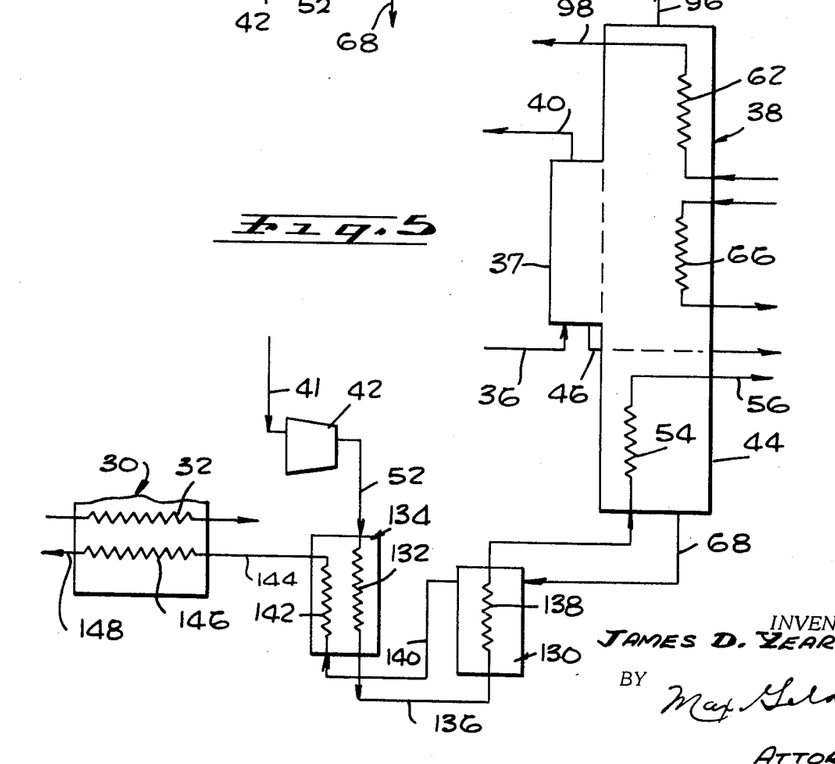
FIG. 5 represents still another modified form of practice according to the invention.

In FIG. 5 there is shown still another modified form of the system described above and illustrated in FIG. 2. In the modification of FIG. 5, the oxygen product compressor 100 of the system of FIG. 2 is eliminated by evaporating the liquid oxygen product with nitrogen gas compressed to the proper pressure. Thus, as shown in FIG. 5, nitrogen gas is compressed at 52 to a pressure of about 4.8 atmospheres, a pressure permitting liquefaction of such compressed nitrogen by evaporation of oxygen in evaporator 130. Such cold compressed nitrogen is further cooled by passage through coil 132 of heat exchanger 134 and the exiting compressed cold nitrogen at 136 is passed through coil 138 of the oxygen vaporizer 130 in heat exchange relation with liquid oxygen product discharged at 68 from column 38 into the vaporizer, bringing about vaporization of the liquid oxygen in the vaporizer. The saturated oxygen vapor at 140 exiting the vaporizer 130 is passed through coil 142 of the heat exchanger 134 for cooling the compressed nitrogen at 132, and the exiting oxygen gas at 144 is passed through coil 146 of the heat exchanger 30 in heat exchange relation with incoming air feed 32, and is discharged at 148 as oxygen product at approximatley ambient temperature.

The nitrogen leaving coil 138 of the oxygen vaporizer 130 and now in both liquid and gaseous form, is further cooled by passage through heat exchange arrangement 54 in the lower portion of the fractionating column 38 to provide heat to the lower portion 44 of the column, as described above, and is discharged as subcooled liquid nitrogen at 56.

Thus, in the modification of FIG. 5, subcooled liquid oxygen is not employed for furnishing additional refrigeration to the upper portion of the column, sufficient refrigeration being afforded by the helium refrigerant in heat exchanger arrangement 66 and the throttled nitrogen in heat exchanger arrangement 62.

Although in the embodiment of FIG. 2, the helium refrigeration coil or exchanger 66 extends upwardly only through part of the upper portion 64 of the column 38, if desired, in order to produce sufficient refrigeration at the top of the column, exchanger 66 can be extended upwardly to a position in the column above that illustrated in FIG. 2, or if desired, an additional helium heat exchanger can be incorporated at the upper end of the column.

In the system of the invention, e.g., as illustrated in FIG. 2, it will be noted that the oxygen-rich liquid 46 withdrawn from the first separation stage 37 is fed directly at 50 essentially in liquid form to the main fractionating column 38, and is subjected directly to differential distillation by the column. Also, the heat pump functions are performed by evaporating and condensing using a dual phase system, that is, gaseous and liquid nitrogen in the exchangers 62 and 54, respectively, of the main fractionating column 38, and by an independent single phase refrigerant such as helium, as at 66 in FIG. 2. These features afford a highly efficient process and system requiring a minimum of additional energy, for separating oxygen and nitrogen in essentially pure form from air.

The system of the invention shown in FIG. 2 can be operated so that substantially pure oxygen and also substantially pure nitrogen are produced as products. Thus, by operating the system illustrated in FIG. 2 so that nitrogen overhead at 40 from the first separation zone contains most of the argon, the nitrogen overhead at 96 from the main fractionating column can be withdrawn as substantially pure nitrogen. Alternatively, by operating so that the nitrogen overhead 96 from the main fractionating column contains substantially all of the argon, and nitrogen overhead at 40 from the intial separation zone 37 is substantially pure nitrogen, the nitrogen stream withdrawn at 98 from the nitrogen heat exchanger 62 in the upper portion of the column, can be taken off as substantially pure nitrogen product.

Figure 6:
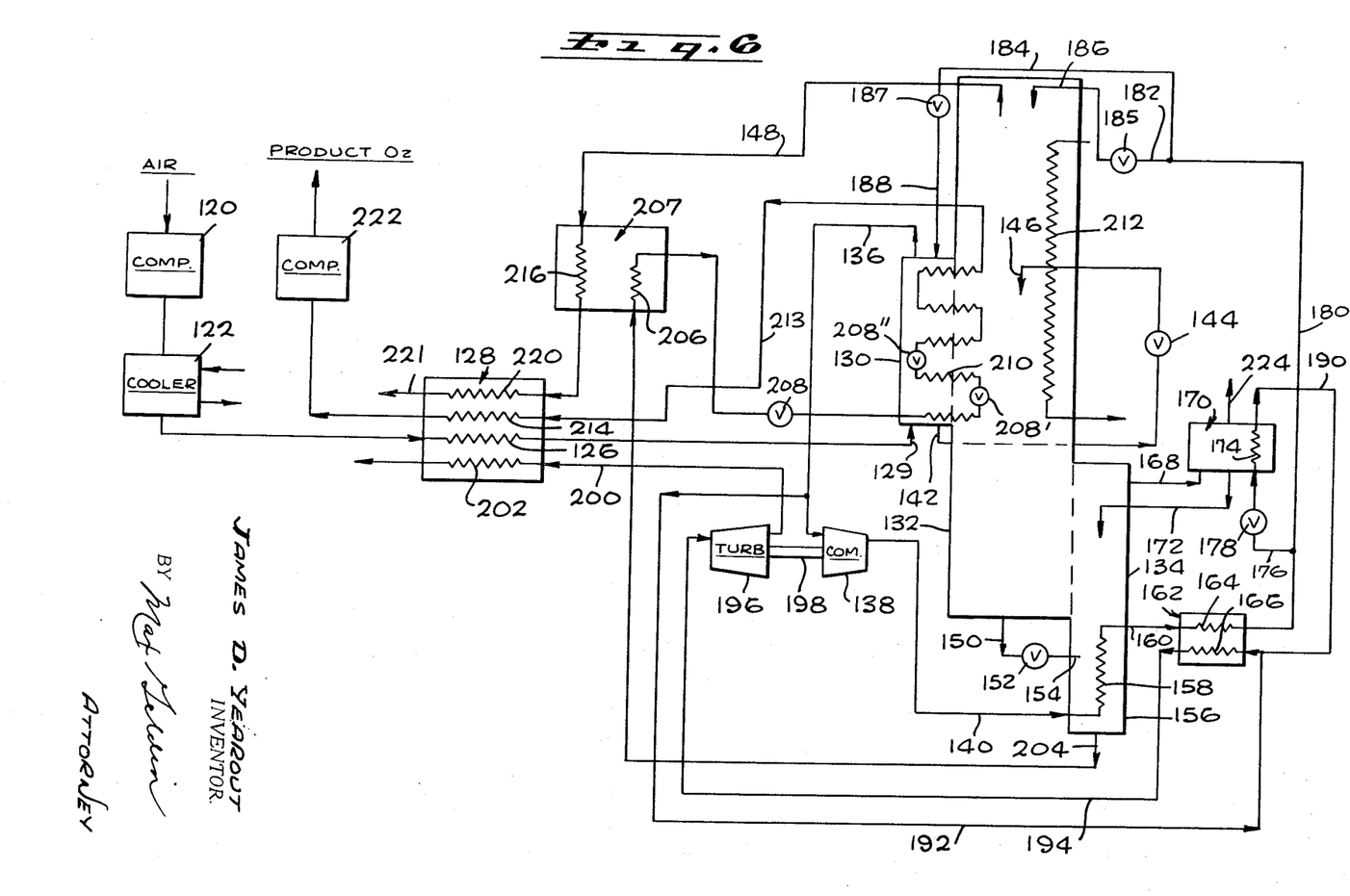
FIG. 6 illustrates a system according to the invention for separating argon, as well as nitrogen and oxygen, in three associated separation zones.

FIG. 6 illustrates a system according to the invention employing three associated separation zones, where it is desired to separate argon, as well as nitrogen and oxygen, from air. In this system air is first compressed at 120 to 2 ½ atmospheres, and water vapor and carbon dioxide are removed by suitable means, such as by adsorption on a molecular sieve. The compressed air is then initially cooleda at 122 and passed through coil 126 of a heat exchanger 128 in countercurrent heat exchange relation with the remaining product streams, to cool the compressed air approximately to its saturation point. The cooled saturated air at a pressure of 2.2 atmospheres is introduced at 129 into the first distillation zone 130 of three associated distillation zones including a second distillation zone 132 and a third distillation zone 134.

Essentially pure nitrogen vapor exits the first distillation zone at 136, and an oxygen-rich liquid is withdrawn from the bottom at 142, the latter liquid being throttled at 144 to a pressure of about 1.3 atmospheres and delivered to the second distillation zone 132, at 146. Such oxygen-rich liquid feed to the second distillation column contains about 46 percent oxygen. The second distillation zone delivers relatively pure nitrogen gas at 148, and a liquid bottoms product at 150 which consists of about 90 to 95 percent oxygen, of the order of about 5 percent argon and small amounts of nitrogen. The bottoms product at 150 is throttled at 152 and introduced as feed at 154 into the third distillation zone 134.

To this point, the distillation has been essentially a separation of oxygen and nitrogen. In the third zone 134, the separation taking place is essentially a separation of oxygen and argon. In the lower portion 156 of the third distillation zone 134, the heat requirement for producing oxygen of a purity of 99.5 percent occurs at very nearly constant temperature, so that a condensing fluid, e.g., nitrogen, is the most satisfactory heat pumping medium. Accordingly, a portion of the nitrogen produced at 136 in the first distillation zone 130 is boosted in pressure by compressor 138 to a pressure of about 4 ¾ atmospheres and the exiting compressed nitrogen is passed through the heat exchanger construction 158 in the lower portion 156 of the third distillation zone 134, to supply heat for differential distillation to the lower portion of the column and supply reboil heat for the lower portion of the third distillation zone. The resulting condensed liquid nitrogen exiting heat exchanger 158 at 160 is then subcooled at 162 by passage through coil 164 thereof in heat exchange relation with cold nitrogen vapor at 166.

The upper portion of the third separation zone 134 delivers a crude argon product at 168, consisting primarily of argon with several percent, e.g., about 5 percent to about 10 percent, of oxygen and nitrogen. The argon overhead at 168 is introduced into a reflux condenser 170. Reflux supplied at 172 to the top of the third distillation zone is provided by evaporation in coil 174 of condensor 170, of a portion of the liquid nitrogen at 176 which is first throttled at 178. By the addition of the proper amount of reflux at 172 to the third distillation zone 134, and by proper choice of column operating pressure in 134, which can be, for example, of the order of about 1.25 atmospheres, the heat requirement at the bottom of the second distillation zone 132 can be made to closely match the refrigeration requirement of the third distillation zone 134, so that the heat required in the lower portion of the second distillation zone 132 is obtained by heat exchange relation with the upper portion of the third distillation zone 134.

The remaining portion 180 of liquid nitrogen from sub-cooler 162 is then separated into two streams 182 and 184, the first stream 182 being throttled at 185 and introduced as reflux at a pressure of about 1.3 atmospheres at 186 into the second distillation zone, and stream 184 being throttled at 187 to a pressure of about 2.2 atmospheres and introduced at 188 as reflux into the first distillation zone 130.

Nitrogen overhead at 190 from the sub-cooler 170, together with the remaining portion 192 of nitrogen overhead 136 from the first distillation zone 130, are passed through coil 166 of the nitrogen sub-cooler 162 for cooling compressed liquid nitrogen at 164. For this purpose, it is convenient to cause the pressure of the throttled nitrogen at 174 to be of the same pressure as the nitrogen overhead at 136 from the first distillation zone 130, that is about 2.2 atmospheres. The nitrogen vapor at 194 exiting the sub-cooler 162 is then expanded in a turbine 196 which is coupled at 198 to the compressor 138 for driving same. The expanded nitrogen vapor at 200 is then passed through coil 202 of the heat exchanger 128 for cooling incoming compressed air feed at 126.

Liquid oxygen product withdrawn at 204 from the bottom of the third distillation zone 134, and having a purity of about 99.5 percent, is passed through coil 206 of the oxygen subcooler 207, and is then evaporated under reduced pressure in heat exchange relation through the first distillation zone 130. For this purpose, it is desirable to evaporate the oxygen product under several different pressures by throttling through several valves 208, 208' and 208'' during passage of the oxygen vapor through the heat exchanger 210 of the first distillation zone 130, in order to more closely match the temperature profiles required by the respective distillation zones.

There is a requirement for additional refrigeration in the system. Thus, in the system shown in FIG. 6, according to this embodiment, additional refrigeration is supplied by the use of helium passing through the heat exchanger construction 212 of the second distillation zone 132. In the heat exchanger 212 the heat exchanger load supplied by the external helium is distributed over a temperature region ranging from about 143° R at the upper end of the heat exchanger 212 to 160° R at the lower end of the heat exchanger, so that such heat exchanger extends in this embodiment, from a point near the upper end of the second column 132, down to a point below the introduction of the feed at 146, and adjacent the lower end of the first distillation zone 130, so as to supply the requisite refrigeration load for the second distillation zone 132, while providing suitable additional refrigeration at the required temperature range for the first distillation zone 130. As in the case of the helium heat exchanger at 66 in FIG. 2, the helium heat exchanger 212 in zone 132 of FIG. 6, is arranged lengthwise of the column to provide efficient differential distillation in the second distillation zone 132.

Oxygen vapor product exiting the heat exchanger 210 in the first distillation zone 130, is passed through coil 214 of heat exchanger 128 for cooling incoming air feed. The oxygen vapor is compressed at 222 and is delivered as product. Nitrogen overhead at 148 from the second distillation zone 132 is passed first through coil 216 of the oxygen sub-cooler 207 for cooling liquid oxygen product, and is then passed through coil 220 of heat exchanger 128 for cooling incoming air feed, and delivered at 221. Argon vapor product is obtained at 224 from the argon condensor 170.

The heat exchanger constructions 158 and 212 for carrying out the differential distillation operations in separation zones 134 and 132 can be of the types noted above, e.g., in the form of a plate-fin heat exchanger.

It will be understood that various external refrigerant media or gases other than helium can be employed for circulation through heat exchanger arrangement 66 in FIGS. 2 to 5, or 212 in FIG. 6, under conditions to withdraw heat ftom the upper portion of column 38 or 132. Thus, for example, instead of helium there can be employed gases such as neon, nitrogen or hydrogen at a suitably low temperature, such gases remaining in the gaseous state.

Referring particularly to the embodiment of FIG. 6, in place of the use of helium as external refrigerant at 212 in the second distillation zone 132, nitrogen gas can be expanded through coil 212 in a recycle gas refrigeration loop, or an auxiliary refrigerator can be incorporated in the nitrogen loop following the sub-cooler 162 to liquefy and subcool a greater portion of the nitrogen overhead 136 from the first distillation zone 130, for introduction at 186 into the second distillation zone.

It will be understood that the systems described above, including the temperatures and pressures set forth, are only illustrative and are not intended as limitative of the invention.

From the foregoing, it is seen that the invention provides a novel improved method particularly designed for separating nitrogen and oxygen as gases from air, employing a main fractionating column operating under substantially atmospheric pressure, with a substantial reduction in power consumption and corresponding increase of efficiency, and with a substantial reduction in capital expense.

Although the invention process and system as described above are designed particularly for separation of the components of air, the principles of the invention and the systems illustrated in the drawings can be similarly applied to the separation of the components of other mixtures of gases containing at least two components having different boiling points. Thus, according to the invention principles as described above, a coke oven gas comprising a mixture of hydrogen, nitrogen, methane, ethylene and other hydrocarbons, can be separated, e.g., for production of hydrogen, ethylene, and other hydrocarbons by the invention system. Further, mixtures of nitrogen and methane, mixtures of nitrogen and hydrogen, and mixtures of nitrogen and helium can be separated employing the invention principles as described above and illustrated in the drawings.

While I have described particular embodiments of my invention for the purpose of illustration, it should be understood that various additional modifications and adaptations thereof may be made within the spirit of the invention, and within the scope of the appended claims.

I claim:

1. A process for the separation of oxygen and nitrogen from a mixture thereof, which comprises carrying out the separation in a plurality of fractionation zones, the respective fractionation zones being connected in adjacent side-by-side indirect heat exchange relation with each other, permitting heat transfer between said fractionation zones through adjacent walls thereof, comprising moderately compressing air, cooling said compressed air approximately to its saturation temperature, introducing said cooled saturated air as feed into an initial fractionation zone comprising one of said plurality of fractionation zones, said initial fractionation zone being connected in adjacent side-by-side indirect heat exchange relation with the upper portion of a fractionating column comprising another of said plurality of fractionation zones, withdrawing nitrogen as overhead from said initial fractionation zone, further comprising at least a portion of said withdrawn nitrogen, then passing said compressed nitrogen as heat exchange fluid in heat exchange relation through and along a substantial lower fractionating portion of said fractionating column under conditions to supply heat to the lower portion of said column and liquefying said nitrogen, further cooling said nitrogen by throttling said liquefied nitrogen, passing said cooled throttled nitrogen in heat exchange relation through and along a substantial upper fractionating portion of said column under conditions to remove heat from the upper portion of said column, vaporizing said cooled throttled nitrogen passed in heat exchange relation through said upper portion of said column, and withdrawing an oxygen-rich liquid mixture from the bottom of said initial fractionation zone, said oxygen-rich liquid mixture then introduced as feed to said fractionating column.

2. A process as defined in claim 1, wherein a portion of said nitrogen withdrawn from said intial fractionation zone is heated and work-expanded, the energy derived from said work expansion being employed for said nitrogen compression.

3. A process as defined in claim 1, including passing a refrigerant from an external source in heat exchange relation through and along an upper fractionating portion of said column for additional removal of heat from said upper portion of said column, and providing refrigeration for said initial fractionation zone.

4. A process as defined in claim 1 for the separation of oxygen and nitrogen from air, which includes withdrawing cold nitrogen from the top of said initial fractionation zone, introducing said oxygen-rich liquid mixture withdrawn from the bottom of said initial fractionation zone, as feed into said fractionating column intermediate the upper and lower end portions thereof, fractionating said mixture to produce liquid oxygen at the bottom of said column and nitrogen at the upper end of said column, further compressing at least a portion of said nitrogen withdrawn from said initial fractionation zone to a pressure sufficient to evaporate fluid in the lower portion of said fractionating column, said further compressed nitrogen introduced as heat exhange fluid in indirect heat exchange relation through and along substantially the entire lower fractionating portion of said column, withdrawing the resulting sub-cooled liquid nitrogen, further cooling said sub-cooled nitrogen by said throttling same, said further cooled liquid nitrogen then passed in indirect heat exchange relation through and along the upper substantial fractionating portion of said column for said removal of heat therefrom, passing an extraneous refrigerant in heat exchange relation through and along an upper fractionating portion of said column for additional removal of heat therefrom, and providing refrigeration for said initial fractionation zone in indirect heat exchange relation with said column, withdrawing liquid oxygen from the bottom of said fractionating column, and withdrawing a nitrogen overhead from the upper end of said column.

5. A process for the separation of oxygen and nitrogen from air as defined in claim 4, and including sub-cooling and throttling said liquid oxygen withdrawn from the bottom of said fractionating column to form a further cooled oxygen liquid, passing said further cooled oxygen liquid in indirect heat exchange relation through and along the upper fractionating portion of said column for removal of additional heat therefrom, and withdrawing oxygen vapor as product.

6. A process for the separation of air into oxygen, nitrogen, and argon, which comprises carrying out the separation in a plurality of fractionation zones, the respective fractionation zones being connected in adjacent side-by-side indirect heat exchange relation with each other, permitting heat transfer between said fractionation zones through adjacent walls thereof, said plurality of fractionation zones including an initial fractionation zone, a first fractionating column and a second fractionating column, said initial fractionation zone being connected in adjacent side-by-side indirect heat exchange relation with said first fractionating column, and said second fractionating column being connected in adjacent side-by-side indirect heat exchange relation with said first fractionating column, comprising introducing compressed air approximately at its saturation temperature into said initial fractionation zone, withdrawing cold nitrogen as overhead from said initial fractionation zone, withdrawing an oxygen-rich liquid mixture from the bottom of said initial fractionation zone, introducing said oxygen-rich liquid mixture as feed to said first fractionating column, fractionating said feed mixture in said first fractionating column to produce an oxygen-argon liquid at the bottom of said column and nitrogen at the upper end of the column, introducing said oxygen-argon liquid as feed into said second fractionating column and fractionating said last mentioned liquid in said second column to produce liquid oxygen at the bottom of said last mentioned column, and an argon overhead, further compressing at least a portion of said nitrogen overhead from said initial fractionation zone, passing said further compressed nitrogen as heat exchange fluid in indirect heat excange relation through and along a substantial lower fractionating portion of said second fractionating column, withdrawing and further cooling a portion of the resulting liquid nitrogen heat exchange fluid, passing said further cooled portion of liquid nitrogen in indirect heat exchange relation with said argon overhead from said second fractionating column for condensing at least a portion of said argon, and introducing said condensed argon as reflux to said second rractionating column, further cooling the remaining portion of the liquid nitrogen withdrawn from indirect heat exchange relation with the lower portion of said second fractionating column, and introducing at least a portion thereof as reflux to said first fractionating column, and passing an extraneous refrigerant in indirect heat exchange relation through and along a substantial upper fractionating portion of said first fractionating column at a temperature to remove heat therefrom and providing refrigeration for said initial separation zone.

7. A process as defined in claim 6, which includes sub-cooling the liquid nitrogen withdrawn as heat exchange fluid from heat exchange relation with said second fractionating column, throttling a portion of said sub-cooled liquid nitrogen for passage in indirect heat exchange relation with said argon for condensing at least a portion thereof, separating the remaining portion of said sub-cooled liquid nitrogen into two streams, throttling said first stream of liquid nitrogen to further cool same and introducing said throttled first stream of nitrogen as reflux into said first fractionating column, throttling said second stream of sub-cooled liquid nitrogen for further cooling same, and introducing said throttled second stream as reflux into said initial fractionation zone, and including mixing said nitrogen vapor following indirect heat exchange relation with said argon, with a portion of said nitrogen overhead vapor from said initial fractionation zone, passing the resulting nitrogen vapor in indirect heat exchange relation with liquid nitrogen withdrawn from heat exchange relation with the lower portion of said second fractionating column, for sub-cooling said liquid nitrogen, work expanding the exiting nitrogen vapors to provide energy for compressing said at least a portion of said nitrogen overhead fron said initial fractionation zone, passing the expanded nitrogen vapors in indirect heat exchange relation with compressed air feed for cooling same, passing the nitrogen overhead from said first fractionating column in indirect heat exchange relation with said liquid oxygen for sub-cooling same, and then passing the exiting nitrogen vapors in indirect heat exchange relation with compressed air feed for cooling same, withdrawing liquid oxygen from the bottom of said second fractionating column, sub-cooling said liquid oxygen and vaporizing said sub-cooled liquid oxygen in indirect heat exchange relation with said initial fractionation zone to remove heat therefrom, and passing oxygen vapors exiting from indirect heat exchange relation with said initial fractionation zone, in indirect heat exchange relation with compressed air feed for cooling same, and compressing the exiting oxygen vapors.

8. The process as defined in claim 6, said initial fractionation zone being connected in adjacent side-by-side indirect heat exchange relation with the upper portion of said first fractionating column, and the lower portion of said first fractionating column being connected in adjacent side-by-side indirect heat exchange relation with the upper portion of said second fractionating column.

* * * * *